(12) United States Patent
Moriya (10) Patent No.: US 6,414,745 B1
(45) Date of Patent: Jul. 2, 2002

(54) METHOD AND APPARATUS FOR DETERMINING THE RELATIVE HEIGHT OF TWO TARGETS

(75) Inventor: Netzer Moriya, Ramat Hasharon (IL)

(73) Assignee: Netmor Ltd., Tel Aviv (IL)

( * ) Notice: Subject to any disclaimer, the term of this patent is extended or adjusted under 35 U.S.C. 154(b) by 0 days.

(21) Appl. No.: 09/462,700

(22) PCT Filed: Oct. 22, 1998

(86) PCT No.: PCT/IL98/00516

§ 371 (c)(1),
(2), (4) Date: Mar. 7, 2000

(87) PCT Pub. No.: WO00/00788

PCT Pub. Date: Jan. 6, 2000

(30) Foreign Application Priority Data

Jun. 30, 1998 (IL) ................................................. 125142

(51) Int. Cl.⁷ .......................... G01C 3/00; G01B 11/26; G01S 13/08; G01S 15/00; G01S 3/80
(52) U.S. Cl. ...................... 356/3.11; 342/123; 342/126; 367/99; 367/118; 356/141.1
(58) Field of Search .............................. 342/126, 123; 367/118, 99; 356/3.11, 141.1

(56) References Cited

U.S. PATENT DOCUMENTS

| | | | |
|---|---|---|---|
| 4,069,591 A | 1/1978 | McArthur | 33/312 |
| 4,356,639 A | 11/1982 | Alarcon Opazo | 33/367 |
| 4,498,764 A | 2/1985 | Bölkow et al. | 356/5 |
| 4,561,188 A | 12/1985 | Williams et al. | 33/366 |
| 4,673,287 A | 6/1987 | Rickus | 356/4 |
| 4,685,219 A | 8/1987 | Haefner et al. | 33/379 |
| 4,727,374 A * | 2/1988 | Boulais | 342/50 |
| 4,820,041 A | 4/1989 | Davidson et al. | 356/1 |
| 4,911,548 A | 3/1990 | Keren-Gill | 356/1 |
| 5,010,768 A | 4/1991 | Le Baud | 73/299 |
| 5,075,722 A | 12/1991 | Adolphson et al. | 355/77 |
| 5,189,484 A | 2/1993 | Koschmann et al. | 356/138 |
| 5,209,449 A | 5/1993 | Hart | 248/475 |
| 5,307,698 A | 5/1994 | Endres | 73/865 |
| 5,592,401 A | 1/1997 | Kramer | 364/550 |
| 5,617,640 A | 4/1997 | Izumitani et al. | 33/367 |

OTHER PUBLICATIONS

"Patent Abstracts of Japan", vol. 098, No. 006, Apr. 30, 1998 7 JP 10 048309 A, Feb. 20, 1998.
"Patent Abstracts of Japan", vol. 008, No. 113 (p–276), May 26, 1984 & JP 59 020810 A, Feb. 2, 1984.

* cited by examiner

Primary Examiner—Stephen C. Buczinski
(74) Attorney, Agent, or Firm—Nath & Associates PLLC; Gary M. Nath; Marvin C. Berkowitz (57) ABSTRACT

An apparatus for determining the relative height between two targets is disclosed. The present invention also discloses a method for determining the relative height between two targets; the method is substantially similar to the operational aspects of the device of the present invention. The method requires no angular measurements in order to determine the different height between the two targets, but rather only distance measurements that can be performed simply and accurately.

The apparatus for determining the relative height between two targets a disclosed. The apparatus includes: two signal-responsive target-objects; a casing housing first and second measurement ports displaced a known distance from each other; at least one signaling module within the casing at each of the measurement ports, for signaling each of the two targets from both of the measurement ports; a distance measuring module coupled to each of the signaling modules for measuring the distance from each port to each target according to the respective signalings of the corresponding signaling modules; and a calculation module coupled to the signaling modules and to the distance measuring module and being responsive to the measured distances for determining: a first triangle formed by the first and second measurement ports and a first one of the two targets, a second triangle formed by the first and second measurement ports and a second one of the two targets, and the relative height between the two targets as the height of a virtual tetrahedron formed the first and second triangles.

14 Claims, 4 Drawing Sheets

METHOD AND APPARATUS FOR DETERMINING THE RELATIVE HEIGHT OF TWO TARGETS

FIELD OF THE INVENTION

This invention relates to a method and apparatus for determining the relative height of two targets.

BACKGROUND OF THE INVENTION

The need to determine the relative height of two points is common in construction, surveying, and navigation. (Relative height, in the present contexts, is always measured with respect to the direction of gravity.) This need is most commonly met by placing an observer either at one of the points or on a line between the two points. In many situations this is impractical or undesirable, since the observer wishes to perform the measurement at a location which is remote to the points.

From a remote location the measurement is most commonly performed using a leveled table called an alidade, from which angular measurements may be made to the two points. According to the tenets of Euclidean geometry, the relative height of the two points may be determined by triangulation using single measurements (often in conjunction with at least one known distance); and this historically has been the accepted method in use.

However, it is often easier to measure distance accurately rather than angular displacement owing to the proliferation of technologies that allow precision distance measurements (e.g. microwave, acoustic, laser, etc.). Distance measuring may be accomplished by measuring the signal propagation time from a transmitter to a receiver. Often the transmitter and receiver are incorporated into the same apparatus, and placed in juxtaposition to a remote signal-reflecting target. Using the signal-reflecting target, the distance to be measured is traversed by the signal from the apparatus to the target and again from the target back to the apparatus, imposing a nominal distance correction calculation. With more sophisticated apparatus, a first signal is sent from the apparatus to the target; and the target actively responds to the first signal by sending back a second signal.

For modest domestic distances (e.g. less than 1000 meters) the first signal may be a radio signal whose distance traversal time may be neglected; and the second signal may be an acoustic signal whose distance traversal time may be very accurately and easily measured. This use of a radio signal trigger for an acoustic signal response is ideal for distance measuring applications; firstly because both signals may be sent Omni-directionally; and secondly because, when a plurality of targets are used, the targets may be individually addressed by coding the radio signal.

Various approaches to the determination of relative height are described in the patent literature. For example, U.S. Pat. Nos. 4,685,219 and 5,209,449 show the use of spirit levels. U.S. Pat. Nos. 4,356,639 5,010,768; 5,307,698 and 5,617, 640 disclose the use of fluid filled tubes for leveling. Other leveling techniques are described in U.S. Pat. No. 4,069,591 which describes the use of a pendulum for leveling; and in U.S. Pat. No. 4,561,188 wherein the use of a gyroscope for leveling is disclosed. U.S. Pat. Nos. 4,673,287 and 5,189, 484 show the use of lasers for leveling; whilst U.S. Pat. No. 5,075,772 employs a video camera for the same purpose.

Likewise, various approaches to precise distance measurement are described in U.S. Pat. Nos. 4,498,764 and 4,498,764 that employ optical techniques; and in U.S. Pat. Nos. 4,820,041; 4,911,548 and 5,592,401 that measure distance based on position coordinates.

All of the prior art approaches either improve a constraint on the location of the observer or require angular measurement, both of which are inconvenient.

SUMMARY OF THE INVENTION

It is therefore an object of the present invention to allow for the relative height between two points both of of which are remote from the location of measurement to determined using precise distance measurements.

In accordance with a broad aspect of the invention there is provided a method for determining the relative height between two points, the method comprising the steps of:

(a) placing a first signal-responsive target-object (hereinafter "target") on the first point and placing a second signal-responsive target-object (hereinafter "target") on the second point, (b) signaling each of the targets from a first reference which is remove from both targets and measuring a respective first and second distance from the first reference to the two targets, (c) signaling each of the targets from a second reference which is displaced a known distance and angular orientation from the first reference and which is remote from both targets and measuring a respective third and fourth distance from the second reference to the two targets, (d) determining a first triangle formed by the first and second reference points and a first one of the two targets, (e) determining a second triangle formed by the first and second reference points and a second one of the two targets, and (f) forming a virtual tetrahedron from the first and second triangles and calculating the relative height between the two targets (the target-to-target edge of the tetrahedron).

It is thus to be understood that such a method requires no angular measurements in order to determine the differential height between the two targets (when the first and second reference are substantially aligned vertically), but rather only distance measurements which can be performed simply and accurately. Furthermore, only nominal corrections (calculations) are required when the reference are not substantially aligned vertically with respect to each other. These nominal corrections are enhanced when the angular displacement of the two references (with respect to the direction of gravity) is known, otherwise the corrections substantially relate to margins of error.

Preferably the first and second reference points are displaced vertically a known distance from one another in order to simplify the trigonometry. Such a method imposes no constrain on the location of an observer and thus allows convenient measurement of locations (targets) that are remote from the observer and not easily accessible.

An apparatus for carrying out such a method comprises:
two (or more) signal-responsive target-objects (for use pair-wise);
a casing housing first and second measurement ports displaced a known distance from each other;
at least one signaling module within the casing at each of the measurement ports being sufficient for signaling each of the two targets from both of the measurement ports,
a distance measuring module coupled to each of the signaling modules for measuring the distance from each port to each target according to the responsive signalings of the corresponding signaling modules; and a calculation module coupled to the signaling modules and to the distance measuring modules and being responsive to the measured distances for determining:

(a) a first triangle formed by the first and second measurement ports and a first one of the two targets, (b) a second triangle formed by the first and second measurement ports and a second one of the two targets, and (c) the relative height between the two targets (with respect to each other) as the height of a virtual tetrahedron formed from the first and second triangles.

According to the preferred embodiment of the apparatus of the present invention, each target is uniquely addressable by the signaling (as described in the background section using the example of "coding the radio signal").

In use the apparatus may be mounted on a tripod including a leveling device for ensuring that the two measurement ports are displaced exactly vertically. Preferably, a display device is coupled to the calculation module so as to provide an immediate readout of the measured relative height. However, the result can be stored for subsequent downloading to a computer or other external system, if required. This use of storage and downloading is especially useful when pair-wise measuring the relative heights of a plurality of target objects.

BRIEF DESCRIPTION OF THE DRAWINGS

In order to understand the invention and to see how it may be carried out in practice, a preferred embodiment will now be described, try way of non-limiting example only, with reference to the accompanying drawings, in which.

DETAILED DESCRIPTION OF A PREFERRED EMBODIMENT

According to the preferred embodiment of the present invention, "a signal-responsive target-object" (hereinafter "target") has an active communications ability, so as to communicate with the control unit (where calculations are preformed). This can be obtained, for instance by an RF communications component incorporated into the target. The signal responsive capability of the target may be used to compare the relative height of any two targets in a group of many targets, since each target may be provided with a unique ID that allows the target to be activated (or deactivated). Furthermore, the signal responsive capability of the target may be used to improve the accuracy of synchronization and calibration timings with the control unit.

According to other embodiments of the present invention, "a signal-responsive target-object" may be a passive element (such as a reflector), or even a designated portion of the object to be measured (such as a selected portion of a building, or a marking drawn on the building, etc.). The requisite distance measurements (which are accomplished using time measurements of the signalings) may optionally be made without the need to physically attach any extraneous components in the physical location being designated as the target. For instance, some laser-based distance measuring systems can detect the reflected beam (off the surface of the location designated), and to analyze it in order to deduce distance.

Simply stated, "a signal-responsive target-object" is:

(a) According to the frequency being used to accomplish the signaling for the distance measurement.

(b) According to the accuracy achievable with that frequency, and (c) According to improvements in the achievable accuracy which may be achieved through the placement of a passive or an active component at the designated remote location.

Figure 1:
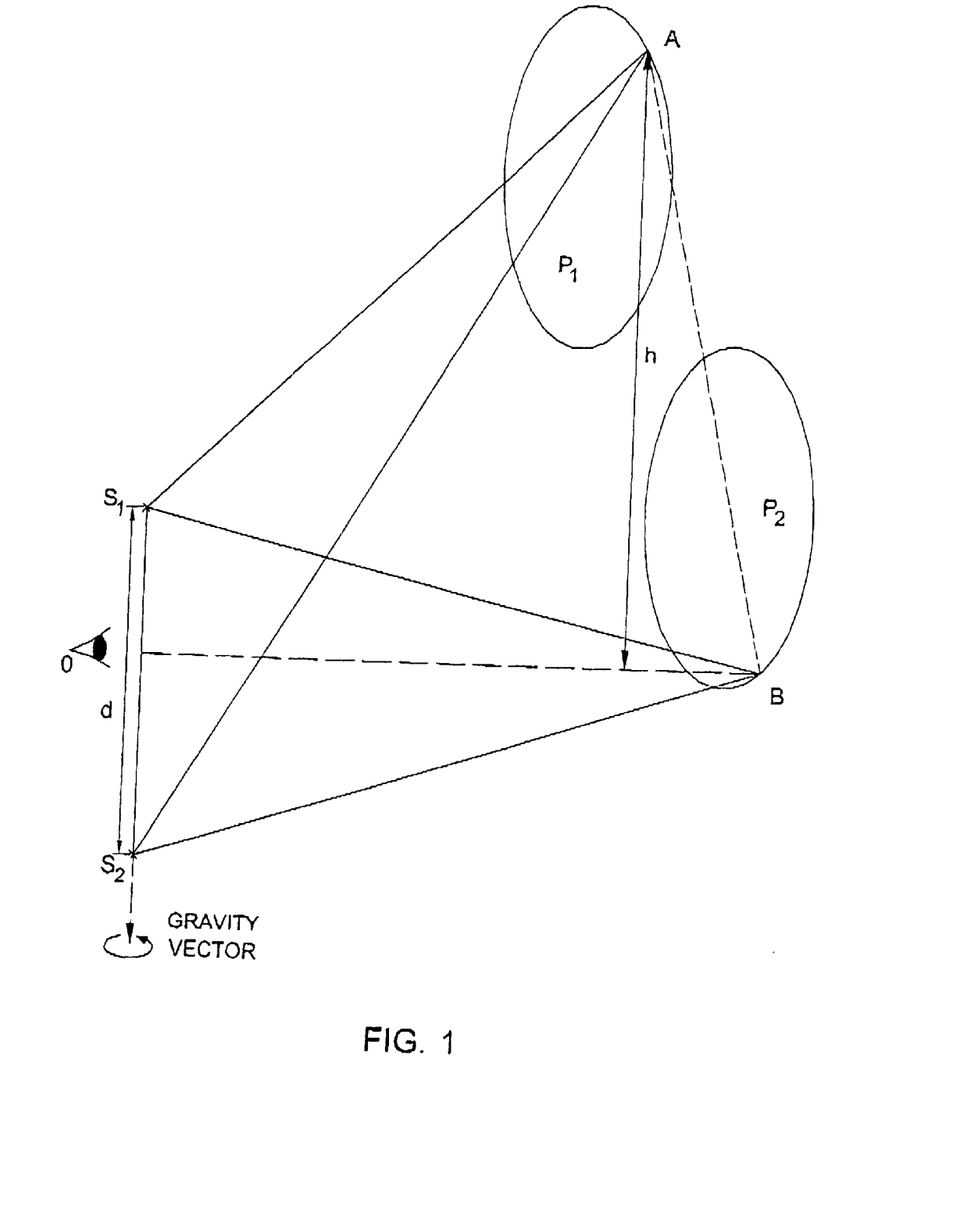
FIG. 1 is a schematic representation showing a method for determining the relative height between two targets in accordance with the invention.

FIG. 1 shows schematically an arrangement including two targets A and B and an observer O remote from both targets and not constrained to lie on a line (shown dotted) joining the two targets. Associated with the observer O are two substantially vertically displaced ports $S_1$ and $S_2$ constituting a first and second reference, respectively. A method for determining the relative height between two points A and B, comprises the following steps:

(a) placing a first signal-responsive target-object (hereinafter "target A") on the first point and placing a second signal-responsive target-object (hereinafter "target B") on the second point, (b) signaling each of the targets A and B from the first reference $S_1$ and measuring a respective first distance $AS_1$ and second distance $BS_1$ from the first reference $S_1$ to the two targets A and B, (c) signaling each of the targets A and B from the second reference $S_2$ and measuring a respective third distance $AS_2$ and fourth distance $BS_2$ from the second reference $S_2$ to the two targets A and B, (d) determining a first triangle ($AS_1S_2$) formed by the first and second reference points $S_1$ and $S_2$, respectively, and the target A, (e) determining a second triangle ($BS_1S_2$) formed by the first and second reference points $S_1$ and $S_2$, respectively, and the target B, and (f) forming a virtual tetrahedron ($ABS_1S_2$) from the first and second triangles and calculating the relative height between the two targets, as the height h of the target-to-target edge of the virtual tetrahedron ($ABS_1S_2$).

In fact, for each pair of signalings of each of the targets, an infinite number of co-planar triangles can be formed each of whose bases is constituted by the imaginary baseline joining the two reference points and whose other sides have lengths which equal the measured distances. However, the apices of each set of triangles lie respective planes $P_1$ and $P_2$ which are both normal to the imaginary baseline joining the two reference points and each set of apices is therefore co--planar. Therefore, whilst it is not possible to determine the exact locations in space of the targets A and B based only on distance measurements, the distance between the two planes $P_1$ and $P_2$ representing the loci of the respective apices can be calculated without requiring any further angular measurements.

In effect the baseline constitutes a hinge axis which sweeps respective circles representing the loci of the respective apices A and B of the two triangles $AS_1S_2$ and $BS_1S_2$.

Therefore, the baseline is preferably vertical so that the respective circles lie in a horizontal plane. In such case, the absolute difference between the z-coordinates of the apices A and B is equal to the required relative height h between two points A and B.

However, the height h may be determinate even if the baseline is inclined to the vertical by a known angle θ; except in the extreme case where the baseline is actually horizontal. In such an extreme case, the respective circles would both lie in a vertical oriented plane; and since the actual position of the points A and B within their respective circles is unknown, so too their relative height displacement would be totally indeterminate from the measurement data.

In practice, the reference points $S_1$ and $S_2$ are fixed locations on the casing of an apparatus used to effect the signaling of the two targets A and B.

Temperature measurement may also be incorporated for use when higher accuracy is needed. For example, the casing has a known temperature coefficient of expansion $\mu$. It is then possible, to compensate for fluctuations in the distance between the two points A and B as a result of variations in ambient temperature providing, of course, that the nominal distance is measured at a known temperature. In the case of distance measuring according to the propagation time for an acoustic signal, the temperature may be used as a correction factor to improve the accuracy of the distance measurements.

Figure 2:
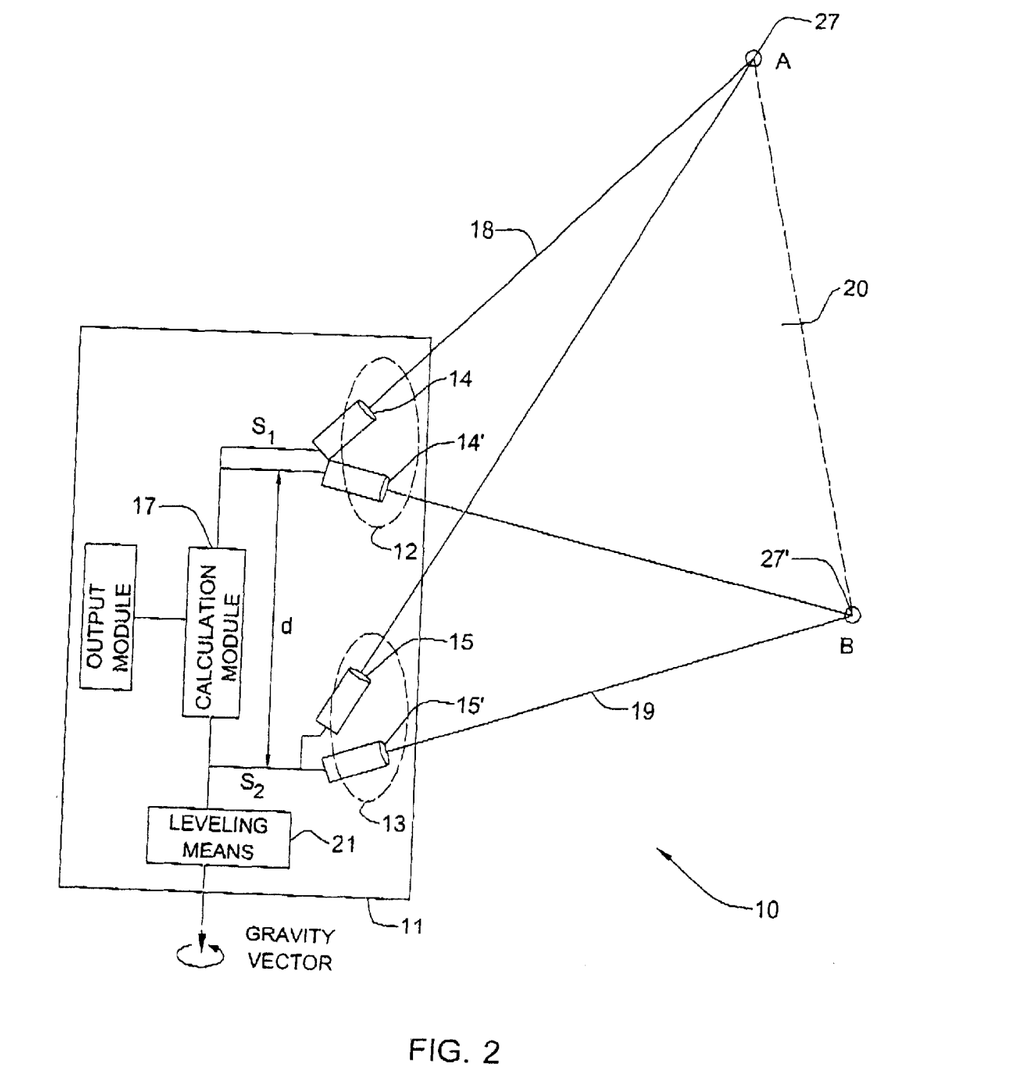
FIG. 2 is a pictorial representation of an apparatus for determining the relative height between two targets according to a first embodiment of the invention.

FIG. 2 shows pictorially an apparatus designated generally as 10 having a casing 11 housing first and second measurement ports 12 and 13, respectively, displaced a known distance d from each other. The distance d is measured at a known ambient temperature $T_0$. Mounted within the casing 11 at each of the measurement ports 12 and 13 is a pair of signaling modules 14, 14' and 15, 15', respectively, for signaling a respective one of the two targets A and B from both of the measurements ports 12 and 13. A distance measuring module 16 is coupled to each of the signaling modules 14, 14' and 15, 15', for measuring the distance from each measurement port 12 and 13 to each target A and B according to the respective signalings of the corresponding signaling modules. A calculation module 17 is coupled to the signaling modules 14, 14' and 15, 15' and to the distance measuring module and is responsive to the measured distances for determining.

(a) a first triangle 18 formed by the first and second measurement ports and a first one (A) of the two targets, (b) a second triangle 19 formed by the first and second measurement ports and a second one (B) of the two targets, and (c) the relative height h between the two targets as the height of a virtual tetrahedron 20 formed from the first and second triangles.

In use the apparatus 10 is preferably leveled (with respect to gravity) so that the imaginary baseline joining the two measurement ports 12 and 13 is vertical. In this case, the h is simply the difference in the z-coordinates of the two apices of the virtual tetrahedron 20. To this end, the apparatus may be fitted with an integral leveling means 21 or, alternatively, may be mounted on and normal to a platform (not shown) so that leveling of the platform ensures that the two measurement ports 12 and 13 lie on a vertical baseline.

Figure 3:
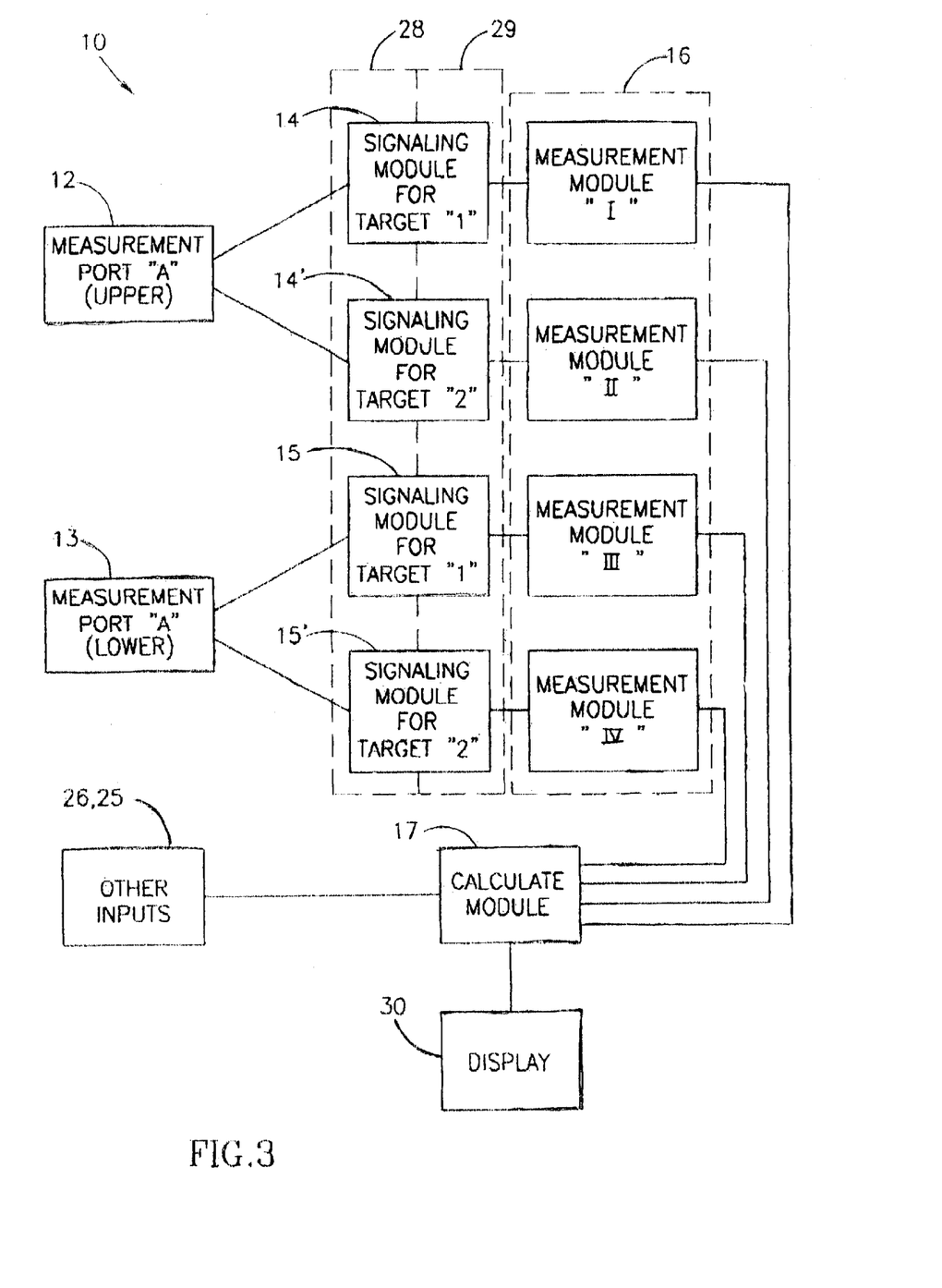
FIG. 3 is a block diagram showing functionally an apparatus according to a first embodiment of the invention.

FIG. 3 is a block diagram showing functionally the apparatus 10 according to a first embodiment of the invention. The apparatus 10 further includes a temperature sensor 25 (constituting an ambient temperature measuring module) for measuring ambient temperature, the calculation module 17 being coupled to the temperature sensor 25 for correcting for fluctuations in the distance d between the two measurement ports 12 and 13 as a function of the measured ambient temperature, or for correction of the distance interpretation of acoustic signal propagation (if used).

A vertical alignment measuring module 26 measures a vertical tilt of the apparatus 10 corresponding to the angle θ between the vertical (i.e. z-axis) and the baseline joining the two measurement ports 12 and 13. The calculation module is coupled to the vertical alignment measuring module 26 and is responsive to the measured vertical tilt θ for determining the actual vertical component along the z-axis of the calculated height h.

As described, two signaling modules are provided at each measuring port 12 and 13 each for signaling a respective one of the points. However, if desired, only a single signaling may be provided, and each measuring port for effecting both of the required signalings of the two points A and B.

Likewise, the distance measuring module 16 may be a single processor coupled to each of the signaling modules 14, 14' and 15, 15' or may comprise discrete modules for each of the signal module 14, 14' and 15, 15'. In either case, the distance measuring module 16 may measures the distance from the corresponding measurement port to the target acoustically, or using a laser measuring device, or using a radio frequency (preferably in the microwave range). In case of the latter, it may be preferable to employ a heterodyne of radio frequencies, so as to simplify measurement (e.g. according to Israel patent application 120806—by the inventor of the present invention). Likewise accuracy of any of the measurements (in any frequency be it acoustical, optical or radio) may be increased by using interference techniques.

In accordance with a preferred use of the apparatus 10, an easily detectable target 27 is affixed in a region of at least one of the points e.g. A, and the corresponding signaling module 14, 14' includes a coarse signaling means 28 for detecting the easily detectable target 27. A fine signaling means 29 is coupled to the coarse signaling means 28 and is responsive to the detection of the target 27 for activating the target A.

In accordance with another preferred use of the apparatus 10, a plurality of measurements are taken and averaged in order to improve the accuracy of the computed relative height of the two points A and B. To this end, the calculation module 17 may include means (not shown) for statistically aggregating a plurality of measurement data taken from at least one location of the apparatus 10.

It has been noted that to the extent that distance measurements only are effected, the method and apparatus according to the invention provide only differential height information and not the absolute Cartesian coordinates of the points A and B. However, if the elevation of at least one of the targets A or B is known relative to the horizontal (i.e. x-y plane), then the calculation module 17 may further include means for computing the relative height of the apparatus with respect to the two targets A and B.

Likewise, in the case that the respective elevations of both the targets A and B are known, the calculation module 17 may be adapted to compute the respective (x, y) coordinates of the two points A and B. These (x, y) coordinates are in accordance with a predetermined Cartesian (x, y, z) frame; and are determined by triangulating the corresponding (x, y) coordinates of the apparatus 10.

Figure 4:
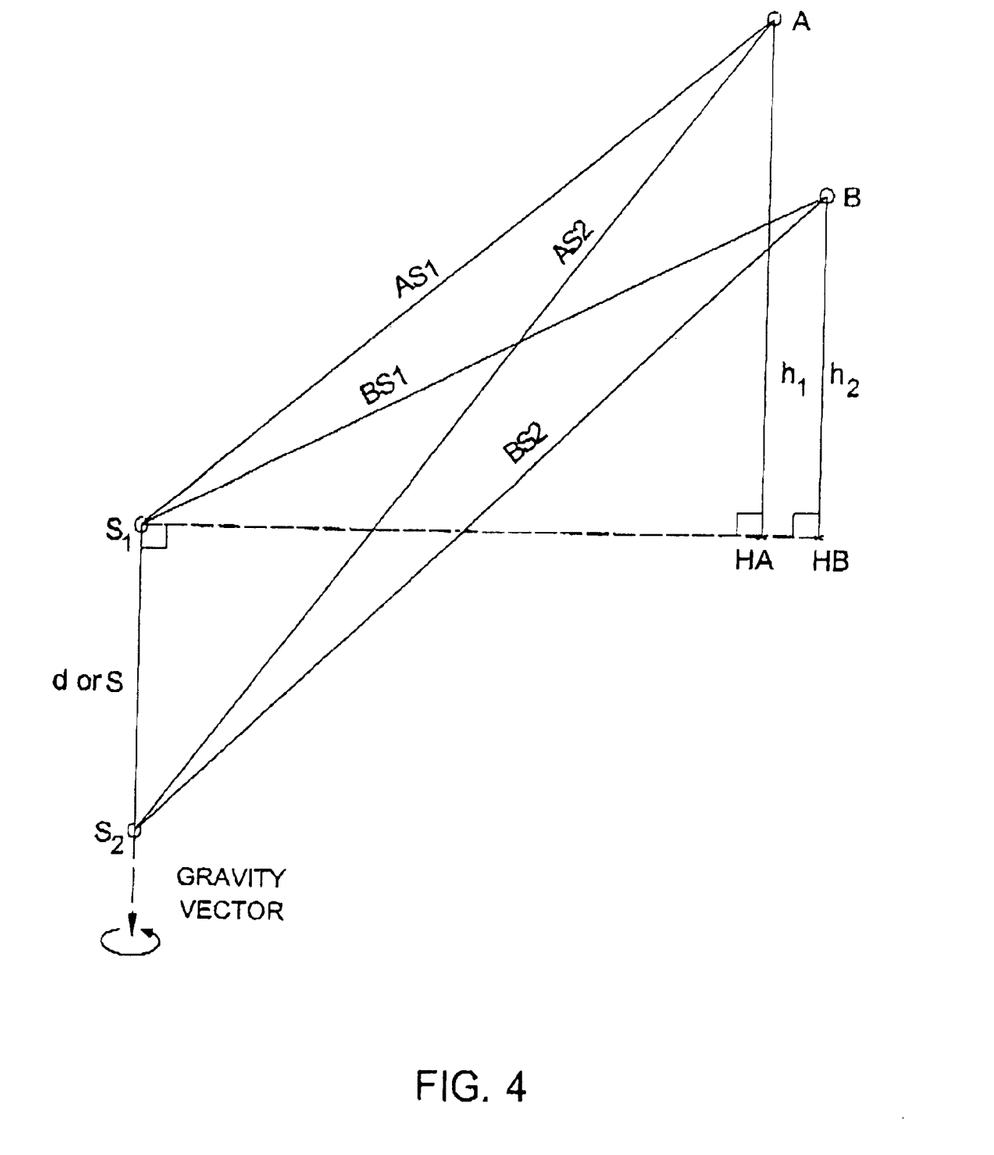
FIG. 4 shows schematically a Cartesian reference frame useful for explaining use of the apparatus according to a second embodiment.

FIG. 4 shows schematically a Cartesian reference frame useful for explaining use of the apparatus according to a second embodiment of the present invention. A first signal-responsive target has been placed at location "A" and a second signal-responsive target has been placed at location "B". There are two references "S1" and "S2" which are vertically aligned one above the other, and are separated by a known distance "S". The determining of the relative height between the two targets is accomplished by substantially simultaneously signaling from each reference to each target. These signalings allow the distances [A,S1], [A,S2], [B,S1], and [B,S2] to become known to the control unit according to characteristics of the signal response time from a reference to a target and back to the reference (as described above).

Providing an imaginary horizontal plane perpendicular to the [S1,S2] orientation and containing the point "S1" allows the difference of height between "A" and "B" to be compared according to the following calculations (or any calculations substantially equivalent thereto). For convenience, we will relate to a point "HA" which is in the plane and directly under point "A", and to a point "HB" which is directly under point "B". In this illustration points "HA" and "HB" are depicted as forming a line with "S1"; but this is never essential to the calculations.

$$\text{Angle } [A,S1,HA] = \text{Angle } [A,S1,S2] - 90 \text{ degrees} \quad (1a)$$

$$\text{Angle } [B,S1,HB] = \text{Angle } [B,S1,S2] - 90 \text{ degrees} \quad (1b)$$

Using the known lengths [S, AS1, AS2, BS1, BS2] of the two triangles having sides [AS1,AS2,S] and [BS1,BS2,S], and the well known law of cosines, we can convert these angles into the following:

$$\text{Cos}(\text{Angle}[A,S1,S2]) = \{(AS2)^2 - (AS1)^2 - S^2\}/\{2*AS1*AS2\} \quad (2a)$$

$$\text{Cos}(\text{Angle}[B,S1,S2]) = \{(BS2)^2 - (BS1)^2 - S^2\}/\{2*BS1*BS2\} \quad (2b)$$

The actual angles then are calculated as follows:

$$\text{Angle}[A,S1,S2] = \text{Arc\_Cos}(\text{Cos}(\text{Angle}[A,S1,S2])) \quad (3a1)$$

Or using $$\text{Angle}[A,S1,S2] = \text{Cos}^{-1}(\text{Cos}(\text{Angle}[A,S1,S2])) \quad (3a2)$$

And $$\text{Angle}[B,S1,S2] = \text{Arc\_Cos}(\text{Cos}(\text{Angle}[B,S1,S2])) \quad (3b1)$$

Or using $$\text{Angle}[B,S1,S2] = \text{Cos}^{-1}(\text{Cos}(\text{Angle}[B,S1,S2])) \quad (2b2)$$

Using the relationship in a right triangle that sin(angle)= opposite side/hypotenuse, that:

$$H1 = (AS1) * \text{Sin}(\text{Angle}[A,S1,HA]) \quad (4a)$$

$$H2 = (BS1) * \text{Sin}(\text{Angle}[B,S1,HB]) \quad (4b)$$

Using the well known angle relationships:

$$\text{Sin}(\text{Angle}[A,S1,HA]) = -\text{Cos}(\text{Angle}[A,S1,HA] + 90 \text{ degrees}) \quad (5a)$$

and $$\text{Sin}(\text{Angle}[B,S1,HB]) = -\text{Cos}(\text{Angle}[B,S1,HB] + 90 \text{ degrees}) \quad (5b)$$

And substituting Equ. (1a) into Equ.(5a) and Equ.(1b) into Equ.(5b) to get:

$$\text{Sin}(\text{Angle}[A,S1,HA]) = -\text{Cos}(\text{Angle}[A,S1,S2]) \quad (6a)$$

$$\text{Sin}(\text{Angle}[B,S1,HB]) = -\text{Cos}(\text{Angle}[B,S1,S2]) \quad (6b)$$

Substituting Equ.(2a) into Equ.(6a) and Equ.(2b) into Equ. (6b) to get:

$$\text{Sin}(\text{Angle}[A,S1,HA]) = -\{(AS2)^2 - (AS1)^2 - S^2\}/\{2*AS1*AS2\} \quad (7a)$$

$$\text{Sin}(\text{Angle}[B,S1,HB]) = -\{(BS2)^2 - (BS1)^2 - S^2\}/\{2*BS1*BS2\} \quad (7b)$$

And substituting Equ.(7a) into Equ.(4a) and Equ.(7b) into Equ.(4b) and eliminating common factors in the numerators and denominators to get:

$$H1 = -\{(AS2)^2 - (AS1)^2 - S^2\}/\{2*AS2\} \quad (8a)$$

$$H2 = -\{(BS2)^2 - (BS1)^2 - S^2\}/\{2*BS2\} \quad (8b)$$

The relative height between the targets |H1-H2| is calculated from Equ.(8a) and Equ.(8b) as $$|H1-H2| = |\{\{(BS2)^2 - (BS1)^2 - S^2\}/\{2*BS2\}\} - \{\{(AS2)^2 - (AS1)^2 - S^2\}/\{2*AS2\}\}|$$

The present invention has been described with a certain degree of particularly. It should be understood, however, the modifications might be made without departing from the scope or spirit of the present invention as hereinafter claimed. In the method claims that follow, alphabetic characters used to designate claim steps are provided for convenience only and do not imply any particular order of performing the steps.

I claim:

1. A method for determining the relative height between two targets, the method comprising the steps of:
   (a) placing a first signal-responsive target and placing a second signal-responsive target;
   (b) signaling each of the targets from a first reference which is remote from both targets and measuring a respective first and second distance from the first reference to the two targets;
   (c) signaling each of the targets from a second reference which is displaced a known distance from the first reference, which is substantially vertically aligned with the first reference, and which is remote from both targets and measuring a respective third and fourth distance from the second reference to the two targets;
   (d) determining a first triangle formed by the first and second reference points and a first one of the two targets;
   (e) determining a second triangle formed by the first and second reference points and a second one of the two targets; and
   (f) forming a virtual tetrahedron from the first and second triangles and calculating the relative height between the two targets.

2. The method according to claim 1, wherein steps (b) and (c) are performed substantially simultaneously.

3. The method according to claim 1, wherein steps (b) and (c) are performed using radio frequency techniques in respect of at least one of the measurements.

4. The method according to claim 1, wherein the first and second reference points are mounted in a common casing and there is further included the step of compensating for variations in said known distance due to fluctuations in temperature.

5. An apparatus for determining the relative height between two targets, the apparatus comprising:
   two signal-responsive target-objects;
   a casing housing first and second measurement ports displaced a known distance from each other, and substantially vertically aligned;

at least one signaling module within the casing at each of the measurement ports, for signaling each of the two targets from both of the measurement ports;

a distance measuring module coupled to each of the signaling modules for measuring the distance from each port to each target according to the respective signalings of the corresponding signaling modules; and a calculation module coupled to the signaling modules and to the distance measuring module and being responsive to the measured distances for determining:
(a) a first triangle formed by the first and second measurement ports and a first one of the two targets;
(b) a second triangle formed by the first and second measurement ports and a second one of the two targets, and
(c) the relative height between the two targets as the height of a virtual tetrahedron formed from the first and second triangles.

6. The apparatus according to claim 5, wherein the distance measuring modules measures the distance from the corresponding measurement port to the target acoustically.

7. The apparatus according to claim 5, wherein the distance measuring modules measures the distance from the corresponding measurement port to the target using a radio frequency.

8. The apparatus according to claim 7, wherein the distance measuring modules measures the distance from the corresponding measurement port to the target using a heterodyne of radio frequencies.

9. The apparatus according to claim 7, wherein said radio frequency is in the microwave frequency range.

10. The apparatus according to claim 5, wherein the distance measuring module uses interference techniques to improve the measurement accuracy.

11. The apparatus according to claim 5, wherein at least one of the signaling modules includes coding for activating the response of a predetermined target object.

12. The apparatus according to claim 5, wherein the calculation module includes means for statistically aggregating a plurality of measurement data taken from at least one location of the apparatus so as to improve the accuracy of the computed relative height of the two points.

13. The apparatus according to claim 5, wherein the calculation module includes means for computing the relative height of the apparatus with respect to the two targets.

14. The apparatus according to claim 5, wherein the calculation module is responsive to respective (x, y) coordinates of the two targets in accordance with a predetermined Cartesian (x, y) frame for computing the corresponding (x, y) coordinates of the apparatus.

* * * * *

UNITED STATES PATENT AND TRADEMARK OFFICE
CERTIFICATE OF CORRECTION

PATENT NO.    : 6,414,745 B1
DATED         : July 2, 2002
INVENTOR(S)   : Netzer Moriya It is certified that error appears in the above-identified patent and that said Letters Patent is hereby corrected as shown below:

Column 10,
Line 24, change "(x, y)" to -- (x, y, z) --.

Signed and Sealed this

Tenth Day of September, 2002

*Attest:*

JAMES E. ROGAN
*Attesting Officer*     *Director of the United States Patent and Trademark Office*